H. E. BROWN.
FABRIC MAKING MACHINE.
APPLICATION FILED NOV. 19, 1915.

1,224,270.

Patented May 1, 1917.
6 SHEETS—SHEET 1.

WITNESSES:
C. A. Soans
Charles A. Becker

INVENTOR
Harvey E. Brown.
BY
Offield Towle Graves + Offield
ATTORNEYS

H. E. BROWN.
FABRIC MAKING MACHINE.
APPLICATION FILED NOV. 19, 1915.

1,224,270.

Patented May 1, 1917.
6 SHEETS—SHEET 3.

WITNESSES:
C. A. Soans
Charles A. Becker

INVENTOR
Harvey E. Brown,
BY
Offield Towle Graves & Offield
ATTORNEYS

H. E. BROWN.
FABRIC MAKING MACHINE.
APPLICATION FILED NOV. 19, 1915.

1,224,270.

Patented May 1, 1917.
6 SHEETS—SHEET 4.

WITNESSES:
C. A. Soars
Charles A. Becker

INVENTOR
Harvey E. Brown,
BY
Offield Towle Graves + Offield
ATTORNEYS

H. E. BROWN.
FABRIC MAKING MACHINE.
APPLICATION FILED NOV. 19, 1915.

1,224,270.

Patented May 1, 1917.
6 SHEETS—SHEET 5.

WITNESSES:
C. A. Soans
Charles A. Becker

INVENTOR
Harvey E. Brown,
BY
Offield Towle Graves + Offield
ATTORNEYS

UNITED STATES PATENT OFFICE.

HARVEY E. BROWN, OF ST. LOUIS, MISSOURI, ASSIGNOR TO THE SIMMONS MANUFACTURING COMPANY, OF KENOSHA, WISCONSIN, A CORPORATION OF WISCONSIN.

FABRIC-MAKING MACHINE.

1,224,270.  Specification of Letters Patent.  Patented May 1, 1917.

Application filed November 19, 1915. Serial No. 62,321.

*To all whom it may concern:*

Be it known that I, HARVEY E. BROWN, a citizen of the United States, residing at St. Louis, in the State of Missouri, have invented certain new and useful Improvements in Fabric-Making Machines, of which the following is a specification.

The object of this invention is to produce a machine that will form a complete wire fabric such as is used for bed bottoms, automatically and cheaply. A complete fabric is formed in the operation of the machine by continually adding fabric members, each of which is formed by the machine from a section of wire.

The particular machine herein illustrated is arranged to produce a fabric composed of wire bent and threaded together in rectangles, so disposed that the longer sides of the rectangles form the lengths and the shorter the widths of the fabrics.

One of the principal features of my invention lies in the disposing of the forming drum, wheel or bar, with its axis at right angles to the feed of the wire, so that its rotation may be in the general direction of the travel of the feed wire. Such an arrangement, on account of the cylindrical form of the drum, provides room for the necessary cutting off and forming of the ends of the wires, and the rotation of the drum takes the finished fabric member around the arc of the drum to make room for the formation and attachment of a following section. It will thus be seen that by arranging the forming and conveying drum at right angles to the feed wire, it is possible to form a complete fabric in a single machine.

In the accompanying drawings, which illustrate one form of machine made in accordance with my invention,—

Like marks of reference refer to similar parts in the several views of the drawings.

Figures 1, 2:
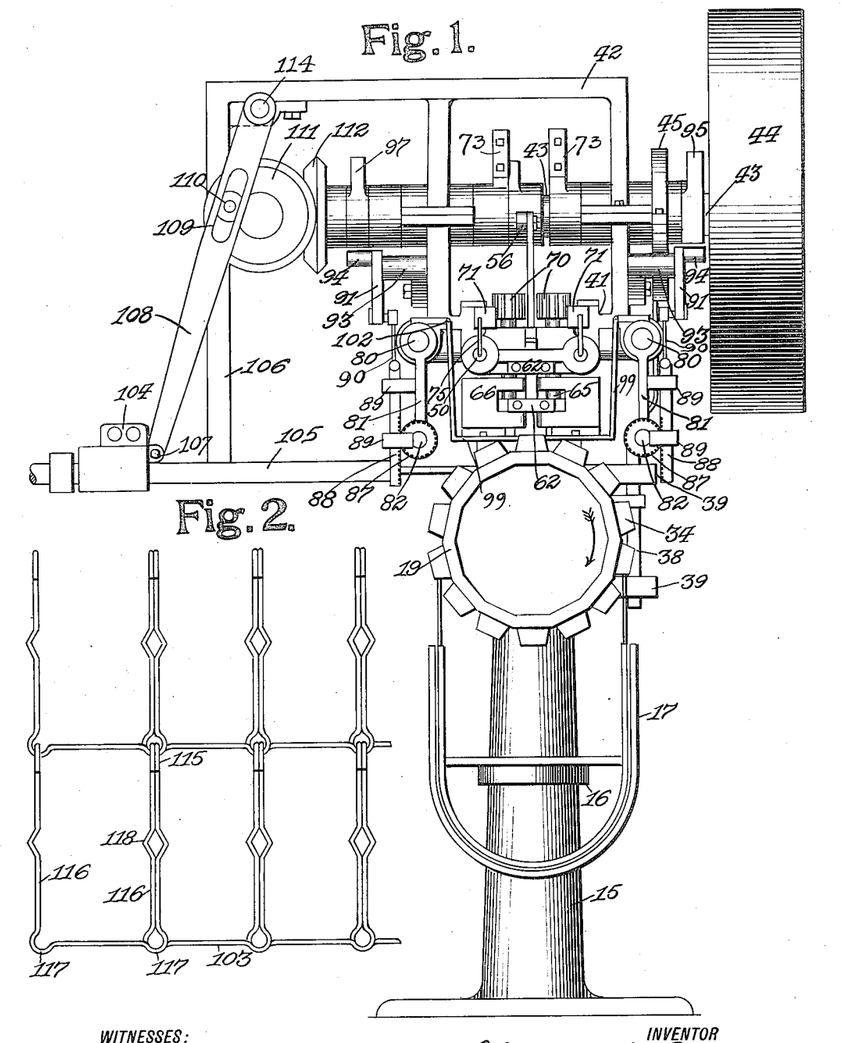
Figure 1 is a front elevation.
Fig. 2 is a view showing a portion of the fabric formed by the machine.
Figures 3, 4:
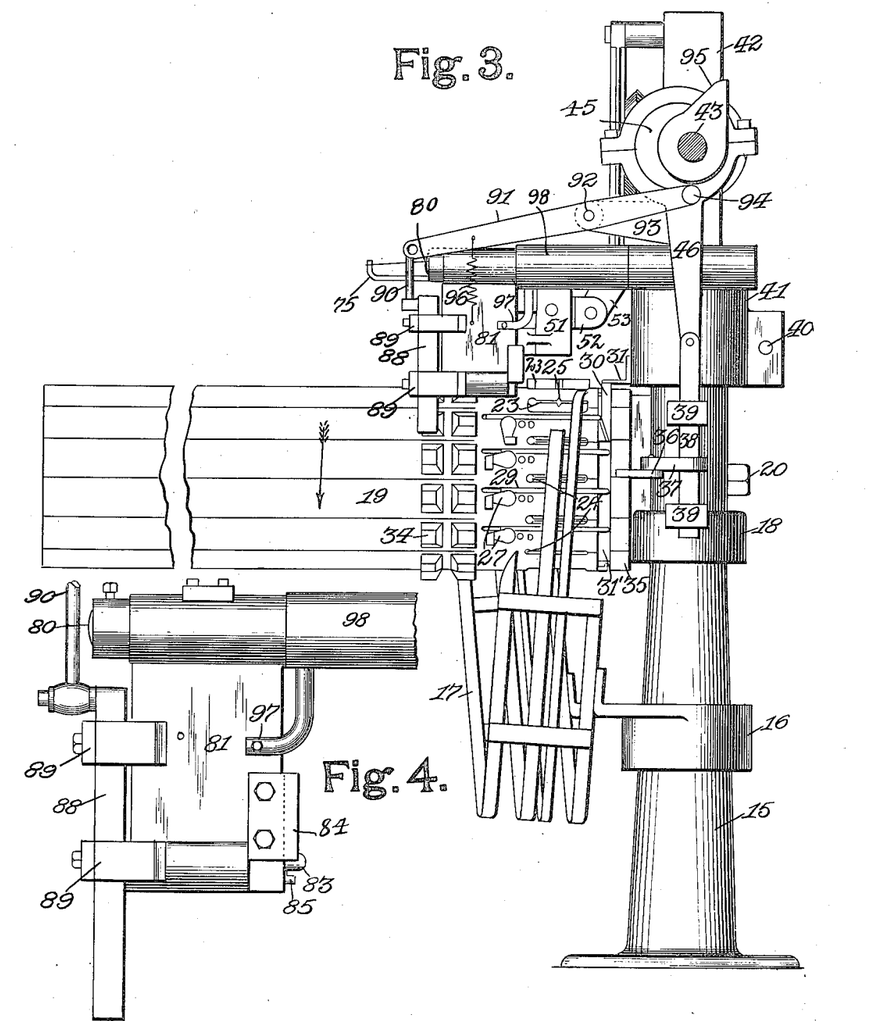
Fig. 3 is a side elevation, the belt wheel being removed.
Fig. 4 is an enlargement of a part of Fig. 3 showing a portion of the forming mechanism.
Figures 7, 8:
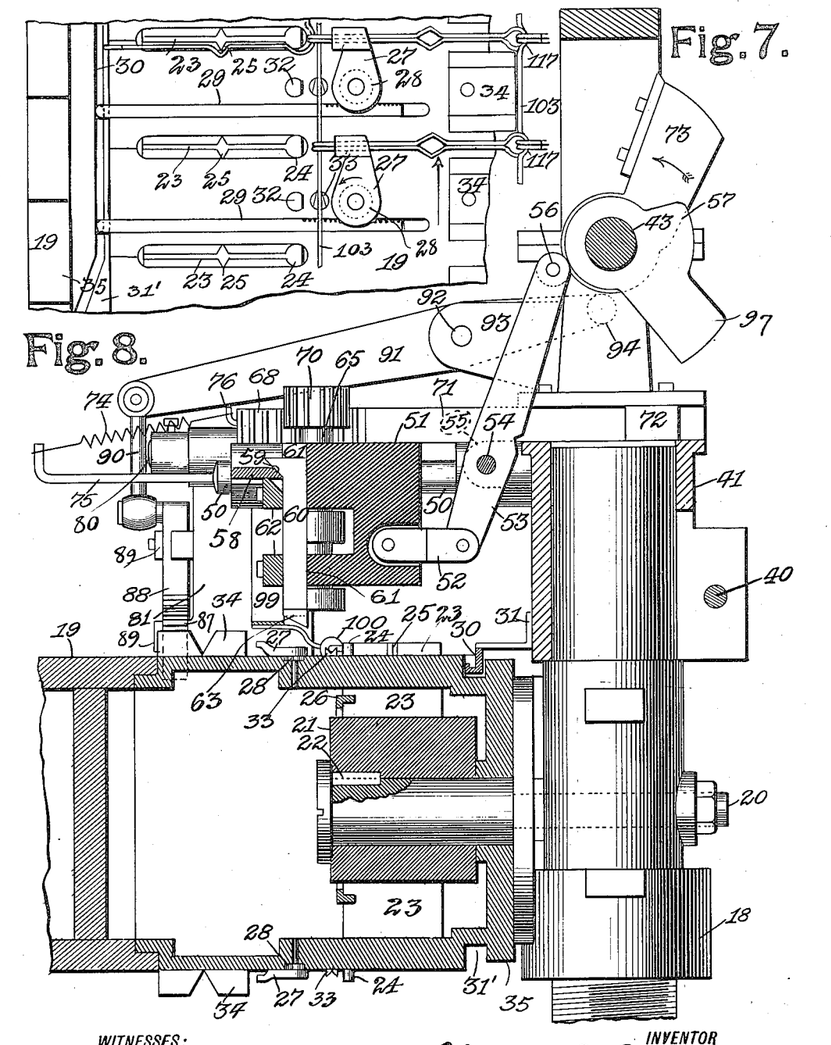
Fig. 7 is a central section through the main portion of the machine.
Fig. 8 is an enlarged view of a portion of the fabric carrying drum.

15 represents a base or pillar upon which the operating parts of the machine are supported. Surrounding this base or pillar 15 is a collar 16 carrying a guide 17 for guiding the fabric to and from the drum, as will be hereinafter described. Secured to the upper end of the pillar 15 is a casting 18 to which the drum 19 is secured by means of a bolt or stud 20, as shown in Fig. 7. The drum 19 is arranged to rotate freely on the inner end of the bolt or stud 20. This stud carries an eccentric cam 21, which cam is prevented from turning by means of a key 22 (Fig. 7). The object of the cam 21 is to cause the forming members 23 to protrude from the face of the drum at the upper part thereof, as shown in Figs. 3 and 7. Each of these forming members 23 is provided at one end with a stop 24 and, near its central part, with projections 25 (Fig. 8) which are adapted to form bends in the central part of the sides of the fabric members, as will be hereinafter more fully described. The members 23 are maintained in contact with the eccentric cam 21 by means of a ring 26 concentric with the said cam. In order to hold the loops of the formed fabric members against the stops 24, I provide the drum with a plurality of detents 27, each of which is provided with a pinion 28. These pinions 28 are engaged by racks 29 set into the surface of the drum and actuated by a cam track 30 supported by a bracket 31 and arranged in a groove 31' formed around the periphery of the drum near its inner end. Arranged between the forming members 23 on the face of the drum are stops 32 and wire guides 33, as best shown in Fig. 8. Adjacent to the detents 27, the drum 19 is provided with a number of blocks 34 which are adapted to receive the formed fabric members and, together with the detents 27, hold the same in proper position for their loops to receive wire to form a new fabric member. The drum 19 projects beyond these blocks 34 a suitable distance to receive the amount of fabric it is desired to form in one piece. The drum, as best shown in Fig. 1, has its periphery formed into a number of flat faces, each of which is equal to a width of one of the fabric members. In the present machine, fourteen of these faces are shown formed on the drum. The number, however, may be varied without affecting the operation of the machine. The rear end of the drum 19 is provided with a ratchet 35 having teeth corresponding in number with the number of faces on the periphery of the drum 19. The drum is fed forward by means of a pawl 36 engaging with the teeth of the ratchet 35. The pawl 36 is pivoted upon an arm 37 carried by a reciprocating bar 38 mounted in guides 39 carried on the casting 18. The bar 38 is operated by means of an eccentric which will be hereinafter described. Secured to the upper end of the casting 18 by means of a bolt 40 is a casting 41 adapted to carry the main operating parts of the machine. This casting 41 supports the frame 42 in which is mounted the main shaft 43 of the machine. Mounted on the end of the shaft 43 is a belt or drive wheel 44 to which power is supplied from any suitable source. Also mounted on the shaft 43 is an eccentric 45 connected by means of a strap 46 with the upper end of the bar 38 hereinbefore referred to.

Figure 9:
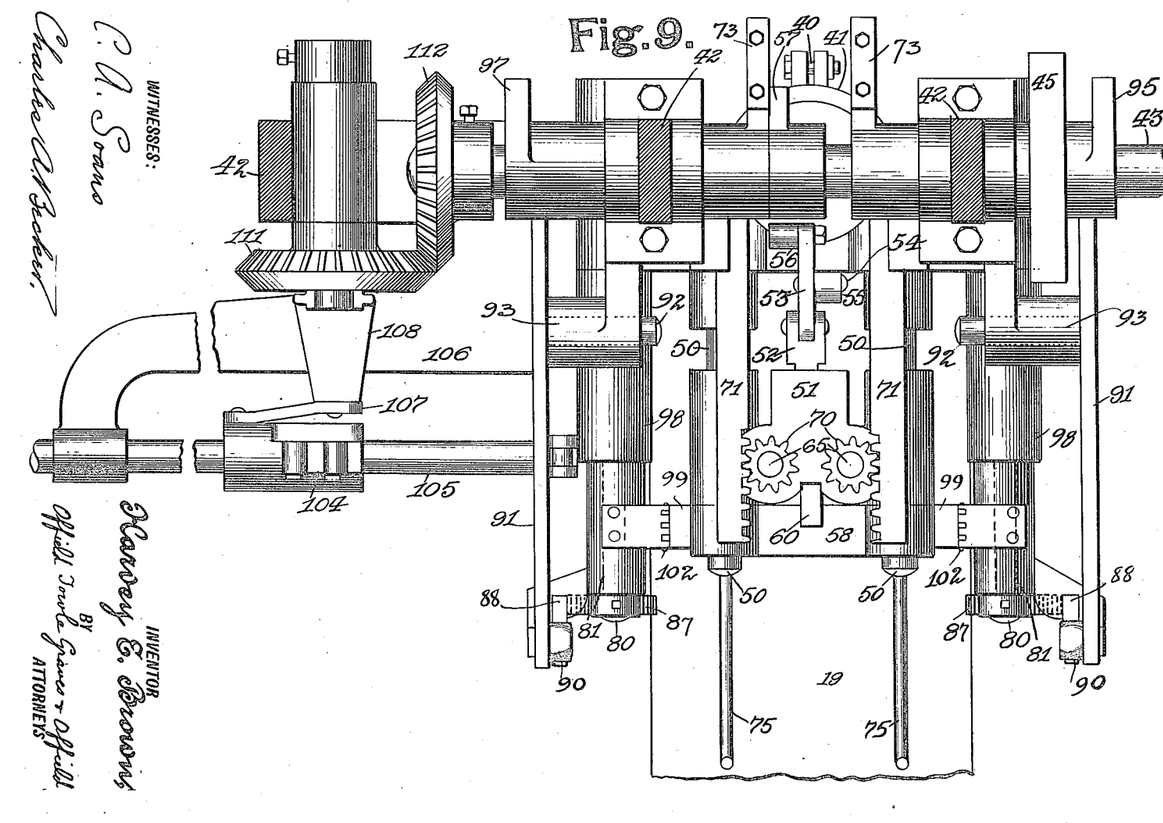
Fig. 9 is a plan view partly in section.
Figure 10:
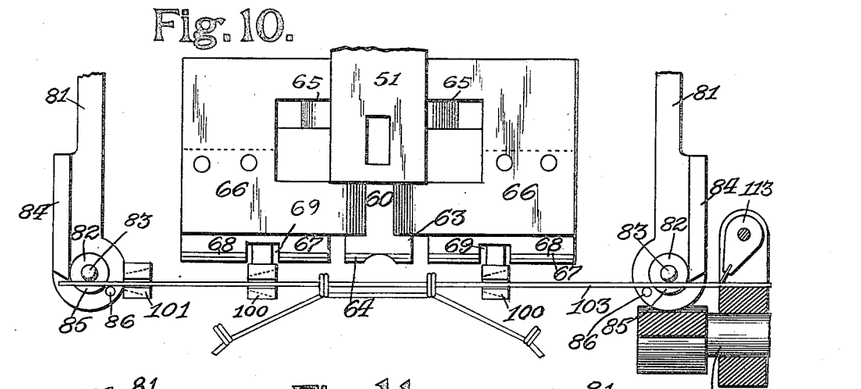
Figs. 10 and 11 are views showing the mechanism for forming the loops on the ends of the fabric members.

Carried by the casting 41 is a pair of studs 50 upon which is slidably mounted a block 51. The block 51 is connected by means of a link 52 to one end of a lever 53 which is pivoted at 54 to a lug 55 carried by the casting 41, as best shown in Figs. 7 and 9. The opposite end of the lever 53 is provided with an anti-friction roll 56 adapted to coöperate with a cam 57 carried on the main shaft 43. In this manner, the block 51 is reciprocated on the studs 50 for a purpose which will be hereinafter set forth. The outer ends of the studs 50 are connected by means of a yoke 58 having an inclined face 59 adapted to coöperate with a correspondingly shaped face on a vertical bar 60. This bar 60 is situated in a slot 61 in the block 51 and is held in sliding relation thereto by means of cross pieces 62. The lower end of the bar 60 is provided with laterally projecting portions 63 so that the bar as a whole forms a T-shaped member. The inner face of the bar is provided adjacent to its lower edge with a groove 64, as best shown in Fig. 10. The object of this groove is to engage the wire of which the fabric member is to be formed. Loosely mounted in the block 51 are a pair of shafts 65. These shafts are so mounted as to have a limited amount of vertical movement. Rigidly secured to the shafts 65 are wings 66, as shown in detail in Fig. 12. These wings are adapted to fold the sides of the fabric member in parallel position. Secured to each of the wings 66 is a blade 67, the inner face of which is provided with a groove 68 for engaging with the wire of which the fabric member is to be formed. Each of the blades 67 is also provided with a central opening 69, as best shown in Fig. 10. The upper ends of the shafts 65 are provided with pinions 70 which engage with rack-bars 71 for operating the blades. These rack-bars are mounted in suitable guideways in the casting 41 and are provided with inwardly projecting blocks 72 adapted to be engaged by cams 73 carried on the shaft 43. In order to return the rack bars 71 to their normal position after being engaged by the cam 73, I provide a coil spring 74 which is secured at one end to a pin 75 carried by one of the studs 50 and at the other to a pin 76 carried by one of the rack bars 71.

Figure 11:
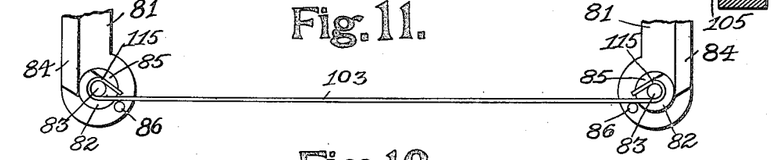

Arranged outside of the studs 50 are a second pair of studs 80 also carried by the casting 41. Each of these studs 80 has pivoted on it a wide arm 81 having journaled in its lower part a rock shaft 82. On the inner end of this rock shaft 82 is a forming pin 83, as best shown in Figs. 10 and 11. The plate 81 has secured to it, adjacent to the rock shaft 82, a blade 84 (Fig. 10) which is adapted to coöperate with a cutting projection 85 on the rock shaft 82 in order to sever the wire. The cutting projection 85 not only coöperates with the blade 84 to sever the wire, but also forms a loop on the same, as best shown in Fig. 11. A stop pin 86 is carried in each of the plates 81 to assist in the formation of the loop.

Figure 5:
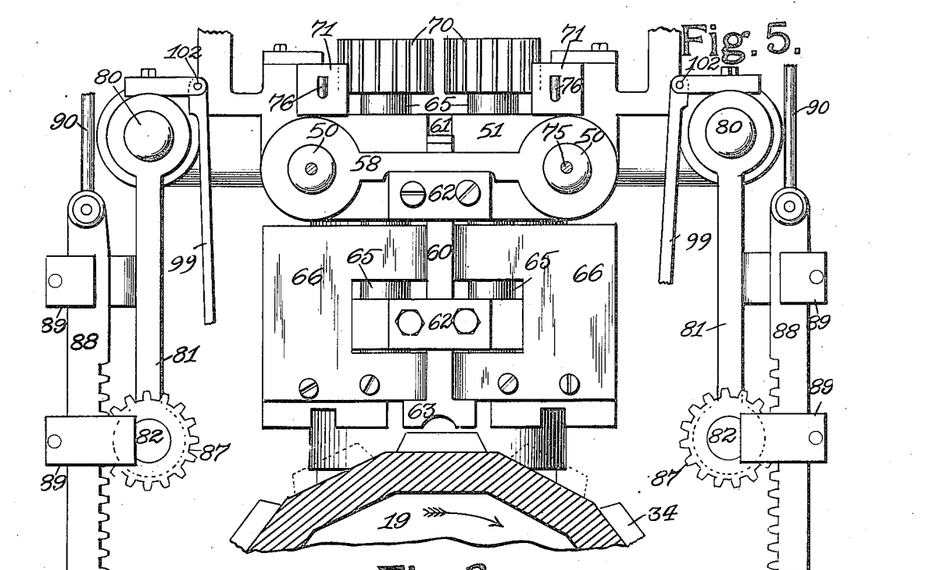
Fig. 5 is an enlarged front view of a portion of the machine.
Figure 6:
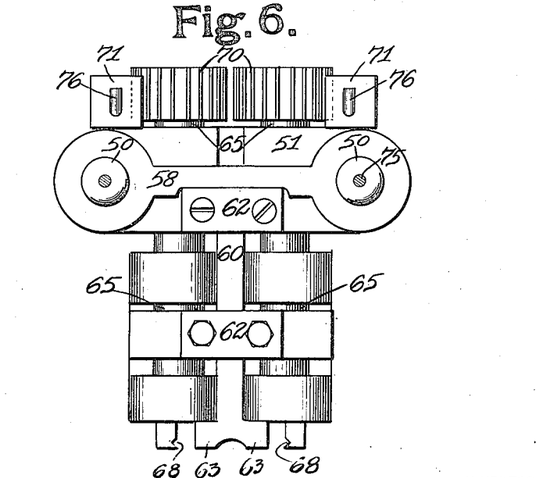
Fig. 6 is a view of some of the parts shown in Fig. 5, the parts, however, being in a different position.

In order to rotate the shafts 82, each of said shafts is provided at its forward end with a gear wheel 87, as shown in Fig. 5. These gear wheels 87 coöperate with rack-bars 88 mounted in guides 89 carried on the plates 81. The upper end of each of the rack-bars 88 is pivoted to a link 90, the opposite end of which is pivoted to a lever 91. The lever 91 is in turn pivoted at 92 to a bracket 93 carried by the frame 42 and provided with an anti-friction roll 94 adapted to be engaged by a cam 95 on the main shaft 43. In order to return the lever 91 to its normal position after it is operated by the cam 95, I secure to said lever one end of a spring 96, the other end of which is secured to the plate 81, as shown in Figs. 3 and 4. This spring not only serves to return the lever 91 to its normal position, but also normally holds the plate 81 against a stop 97 carried by a sleeve 98, rigidly secured to the stud 80. Secured to the upper edges of the plate 81 are the ends of a U-shaped member 99 carrying wire guides 100, as best shown in Figs. 7 and 10. A wire guide 101 similar to the guides 100 is also carried on the plate 81 at the side opposite to that into which the wire is fed. The member 99 is pivoted at point 102, as shown in Fig. 5, so that the said member will not interfere with a slight rocking motion of the plate 81, which is caused by the formation of the loops on the end of the wire, as will be hereinafter described. In order to feed the wire 103 into the machine, the wire is engaged by means of a feed dog of any usual construction. This feed dog 104 slides upon a rod 105, carried by a bracket 106 secured to the frame 42. The feed dog is connected by means of a link 107 with an arm 108 having a slot 109 engaging with a pin 110 on a bevel gear wheel 111, carried on the frame 42, as best shown in Figs. 1 and 9. The arm 108 is pivoted to the frame 42 at 114. This bevel gear wheel 111 is engaged by a second bevel gear wheel 112 mounted on the end of the shaft 43. It will thus be evident that each time the shaft 43 is rotated, the feeding mechanism 104 will be reciprocated along the shaft 105. Arranged on the shaft 105, adjacent to the plate 81, is a detent 113 of any usual form for preventing the wire 103 from being moved backward during the return movement of the feeding mechanism 104.

Figure 12:
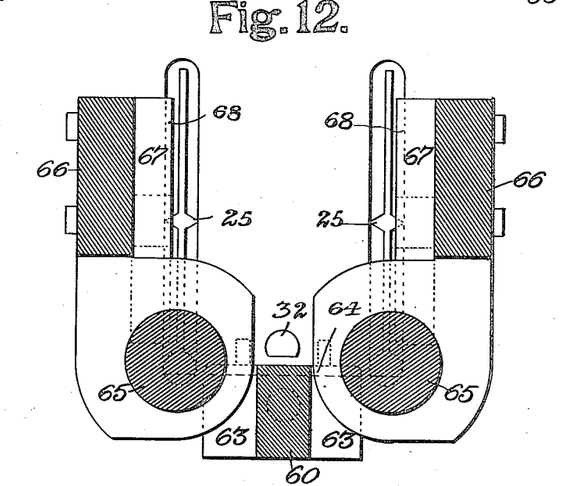
Fig. 12 is an enlarged view of the mechanism for folding the two sides of the fabric members in parallel position.

The operation of my machine will now be briefly described. The wire 103 is fed into the machine by the forward movement of the feeding device 104. The wire 103 first passes between the blade 84 at the left hand side of the machine and its coöperating cutting projection 85. The wire then passes through the first wire guide 100 and through the loops of the fabric sections which have been previously formed. After passing through the fabric sections, the wire then passes through the second guide 100 to the guide 101, and to the second cutting members 84 and 85. The stroke of the feeding device is so arranged that slightly more wire will be fed into the machine than is necessary to form one of the fabric members. The surplus wire is cut off by the second cutting members 84 and 85, as shown in Fig. 10. The purpose of this is to insure uniform length of the wire, even if there should be a slight variation of the feed. While the wire is fed through the loops of the preceding fabric members, the said loops are held in alinement against the forming members 24 by means of the detents 27, as best shown in Fig. 8. After the wire has been fed into position, as shown in Fig. 10, the cams 95 will come into contact with the anti-friction rolls 94 on the levers 91 and actuate the said levers to raise the rack bars 88, and thus rotate the rock shafts 82 so as to cause the members 85 to coöperate with the blades 84 in cutting the wire at both ends, and to also cause said members to carry the ends of the wire around the loop forming pins 83, so as to form loops 115 on the ends of the wire 103, as best shown in Fig. 11. It will be evident that the formation of these loops on the ends of the wire will somewhat shorten the wire. This is compensated for by the movement of the plates 81 toward each other on their pivots. After the formation of the loops 115 on the ends of the wire 103, the cam 57 comes in contact with the anti-friction roll 56 on the end of the lever 53, thus causing the block 51 to be moved rearwardly along the studs 50. This movement of the block 51 along the studs 50 allows the member 60 to move downwardly and as this member supports the wings 66, the said wings also move downwardly, so that said parts assume a position such that the grooves 64 and 68 in the members 63 and 67 will engage with the wire 103. The arms 63 of the member 60 hold the central part of the cross piece of the fabric member against the stop pin 32 while the blades 67 fold the sides of the fabric member into position. The object of raising the member 60 and wings 66 on their rearward movement is to remove them out of the path of the various projecting portions of the drum 19. After the loops 115 have been formed upon the ends of the wires, the cams 73 come into contact with the blocks 72 on the rack shaft bars 71, thus actuating the pinions 70 to rotate the shafts 65 and thus fold the wings 66, as best shown in Fig. 12. This folding of the wings 66 causes the blades 67 to engage with the wire 103 and bend the same around the forming members 24, so as to form parallel side pieces 116 of the fabric members. Half loops 117 are thus formed at two corners of the fabric member. At the same time, the sides 116 of the fabric member are folded into parallel position, the recesses 69 in the blades 67 coöperate with the projections 25 on forming members 24 to form bends 118 in the side members 116, and thus increase their resiliency. After the cams 73 release the rack bars 72, they are returned to their normal position by means of the springs 74 and the parts of the machine thus assume their normal position. The drum 19 is now fed forward by the action of the feed pawl 36 and the machine is ready to begin the operation of forming a new fabric member.

The formed fabric members, after leaving the drum 19, are engaged by the guide 17, and are carried downwardly and then upwardly, at the opposite side of the drum where they are again delivered to the drum. Each fabric member in being carried around the drum by the guide 17 is, at the same time, carried forward a distance equal to its own length, this is, when it is a second time presented to the drum, it is moved toward the outer end of the drum sufficiently to bring its loops 115 into position to receive the wire 103 which is to form a new fabric member.

Since modification may be made in the machine whereby fabric members may be formed having different shape from those described, and changes may be made in the shape, arrangement and details of construction of the parts of the machine without departing from the general principles of operation thereof, I do not desire that the scope of my invention be limited otherwise than by the appended claims.

I claim:

1. A fabric making machine comprising a rotatable drum for supporting a previously completed fabric portion, mechanism for forming successive lengths of wire and engaging the same with the end of the previously completed fabric portion, means for effecting step-by-step rotary movements of said drum, to enable successive fabric units to be connected to said fabric, side by side, means for severing said lengths of wire successively from the end of a continuous wire supply, and means for feeding said wire in a direction lying in a plane substantially at right angles to the axis of the drum.

2. In a fabric making machine, the combination of means for successively supplying to the machine sections of wire of equal length, means for bending each section and forming loops on the ends thereof, and means for inserting each section of wire into the loops of another section before said first-named section is bent.

3. In a machine of the character described, the combination of means for forming loops on the ends of a section of wire, means for bending the wire to form a fabric member, means for feeding a succession of similar sections of wire to the looping and bending means, each section being fed through the loops of a previously formed fabric member.

4. In a machine of the character described, the combination of means for forming loops on the ends of a section of wire, means for bending the wire to form a fabric member, means for feeding a succession of similar sections of wire to the looping and bending means, each section being fed through the loops of a plurality of previously formed fabric members.

5. In a machine of the character described, means for forming loops on the ends of a section of wire, means for bending the wire to form a fabric member, means for holding the loops in alinement, means for passing a succeeding section of wire similar to the first through the loops, and for positioning the same in operative relation to the bending and loop forming means.

6. In a fabric making machine, the combination of means for supplying sections of wire, means for forming loops on each end of each section, means for bending each section at two separate points intermediate its ends to form a fabric member having two separated parallel portions with a cross connecting portion between them, and means for inserting each section of wire as supplied to the machine through loops of a previously formed fabric member.

7. In a fabric making machine, a fabric support, means for forming fabric members thereon, means for bringing each fabric member to a position on the support removed longitudinally a distance equal to the length of the fabric member from the position it first occupied when formed, and means for attaching an additional fabric member to the first-named member while in said second position.

8. In a fabric making machine, a rotatable drum, fabric forming and holding members carried thereby, wire bending and looping mechanism, coöperating with the drum to form a fabric member, means for feeding wire to said mechanism, and a guide for causing the fabric to advance in a direction parallel to the longitudinal axis of the drum.

9. In a fabric making machine, a rotatable drum, fabric forming and holding members carried thereby, wire bending and looping mechanism coöperating with the drum to form a fabric member, means for feeding wire to said mechanism, and means for causing the fabric to advance in a direction parallel to the longitudinal axis of the drum to bring the fabric members into operative relation with the feeding mechanism.

10. In a machine of the character described, a fabric supporting drum, fabric forming members carried thereby, means for bending the wire around the fabric forming members, means for rotating the drum, and means for retracting the fabric forming members.

11. In a machine of the character described, a fabric supporting drum, fabric forming members carried thereby, devices adjacent to the drum for forming loops on each end of a section of wire, and means actuated to bend the wire sections around the forming members on the drum after the loops are formed.

12. In a machine of the character described, a fabric supporting drum, fabric forming members carried thereby, devices adjacent to the drum for forming loops on each end of a section of wire, means actuated to bend the wire sections around the forming members on the drum after the loops are formed, and means for successively feeding sections of wire to the looping and bending means.

13. In a machine of the character described, a fabric supporting drum, fabric forming members carried thereby, devices adjacent to the drum for forming loops on each end of a section of wire, and devices actuated to bend the wire section around the forming members to bring the loops into alinement.

14. In a machine of the character described, a fabric supporting drum, fabric forming members carried thereby, devices adjacent to the drum for forming loops on each end of a section of wire, devices actuated to bend the wire section around the forming members to bring the loops into alinement, means for supplying wire to the looping devices, and means for bringing each pair of loops across the path of the wire as the same is fed to the looping devices.

15. In a fabric making machine, the combination with a fabric support, of means for feeding a wire through the loops of fabric members on said support, and a pair of loop forming devices engaging with said wire, said loop forming devices being movable toward and away from each other.

16. In a fabric forming machine, the combination with a fabric support, of means for alining fabric members on said support, means for feeding a wire through the loops of said fabric members, and a pair of loop forming devices engaging with said wire, said loop forming devices being movable toward and away from each other.

17. In a fabric making machine, the combination with a fabric support, of means for feeding a wire through the loops of fabric members carried by said support, means for forming loops on said wire, and a folding device for bending said wire to form a fabric member, said folding device being movable toward and away from said fabric support.

18. In a fabric making machine, the combination with a rotary drum, of a stationary cam, forming members adapted to be projected from the periphery of said drum by said cam, and a folding device for bending wire around said forming members to produce fabric members.

19. In a fabric making machine, the combination with a rotary drum, of a stationary cam, forming members adapted to be projected from the periphery of said drum by said cam, a folding device for bending wire around said forming members to produce fabric members, and means for moving said folding device longitudinally of the drum.

20. In a fabric making machine, the combination with a rotary drum, of a stationary cam, forming members adapted to be projected from the periphery of said drum by said cam, a folding device for bending wire around said forming members to produce fabric members, and means for moving said folding device longitudinally of the drum, said folding device being movable toward and away from the face of the drum.

21. In a fabric making machine, the combination with a rotary drum, of forming members carried by said drum, means for supporting a plurality of formed fabric members adjacent to said forming members, means for feeding wire through the loops of said fabric members, and a folding device coöperating with said forming members to bend the wire to form a new fabric member.

22. In a fabric making machine, the combination with a rotary drum, of forming members carried by said drum, means for supporting a plurality of formed fabric members adjacent to said forming members, means for feeding wire through the loops of said fabric members, means for forming loops on the ends of said wire, and a folding device coöperating with said forming members to bend the wire to form a new fabric member.

23. In a wire fabric making machine, link-making mechanism which includes symmetrically disposed rotary severing and forming members for operating on the ends of the wire blank, means for feeding a wire blank into the field of said members, and means permitting movement of said members bodily toward each other during the forming movement.

24. In a wire fabric making machine, mechanism for making links with hooks on either end, which includes symmetrically disposed rotary former members, means for feeding a wire blank into position with its ends in the field of said rotary former members, means for actuating said rotary former members to form said hooks on the ends of said blank, and means for centrally bending said blank subsequent to the formation of said hooks.

25. In a wire fabric making machine, mechanism for making links with hooks on either end, which includes symmetrically disposed rotary former members, means for feeding a wire blank into position with its ends in the field of said rotary former members, means for actuating said former members to form said hooks on the ends of said blank, means permitting said formers to approach each other during the formation of said hooks, and means for centrally bending said blank subsequent to the formation of said hooks.

26. In a machine for making wire fabric, link forming mechanism, which comprises means for severing the end of a continuous wire supply, a pair of symmetrically disposed rotary members for severing the wire length from the end of said continuous wire supply and for bending the extremities of said wire blank after severance thereof, and means for centrally bending said wire blank operating subsequent to the rotary members.

27. In a machine for constructing fabric, which includes serially connected interhooked wire links or units, the combination of means for feeding wire blanks into interlocking engagement with the formed terminal portion of a unit or link connected to a previously formed fabric length, and means for afterward bending said blank, intermediate its ends, to provide it with a pair of terminal limbs parallel with the terminal link or unit of the previously completed fabric portion.

28. In a machine for constructing tubular wire fabric, comprising a series of serially connected interhooked wire links disposed substantially parallel to the axis of the tube, the combination of a rotary member for supporting said fabric with the two axes substantially parallel, means for feeding a wire blank in a plane substantially tangential to said support and in a plane substantially at right angles to the axis of said support, and means for bending the ends of said blank to form substantially parallel limbs parallel to the axis of said support.

29. In a machine for constructing tubular wire fabric, comprising a plurality of series of interhooked wire links connected serially in a direction parallel with the axis of the fabric, the combination of a drum adapted to enter and support said fabric, means for effecting step-by-step movements of said drum, means for feeding a wire blank into a position symmetrically disposed at right angles to a radius drawn from the center of said drum and at right angles to the axis thereof, and means for symmetrically bending said blank to produce a fabric member having symmetrical terminal limbs disposed in a plane tangential to said support and with the axis of the unit in a plane substantially containing the axis of said support.

30. In a machine for constructing tubular wire fabric, comprising a plurality of series of interhooked wire links connected serially in a direction parallel with the axis of the fabric, the combination of a drum adapted to enter and support said fabric, means for effecting step-by-step movements of said drum, means for feeding a wire blank into a position symmetrically disposed at right angles to a radius drawn from the center of said drum and at right angles to the axis thereof, means for forming hook portions on the extremities of said blank, and means for symmetrically bending said blank to produce a fabric member having symmetrical terminal limbs disposed in a plane tangential to said support and with the axis of the unit in a plane substantially containing the axis of said support.

31. In a machine for making wire fabric composed of similarly formed fabric units, each adapted to constitute at least two sides of one of the meshes of the fabric, the combination of means for feeding fabric members, one at a time, and means for successively connecting said fabric members, one at a time, to the previously completed fabric portion.

32. In a machine for making wire fabric composed of similarly formed fabric units from a continuous length of wire, the combination of means for severing successively equal lengths of wire from said continuous length, means for forming said wire into incomplete fabric members, and means for connecting said fabric members to a previously formed fabric portion to constitute adjacent fabric units forming the boundaries of adjacent meshes of said fabric and for completing said fabric unit.

33. In a machine for making tubular wire fabric composed of spirally arranged, similarly formed fabric units, the combination of means for feeding and severing lengths from a continuous wire supply, means for forming said lengths to form fabric members, and means for successively connecting said fabric members, one at a time, in spiral relation to a previously formed fabric portion to constitute said fabric units.

34. In a machine for making an indefinite length of tubular wire fabric composed of spirally arranged, similarly formed fabric units, each adapted to constitute at least two sides of one of the meshes of the fabric, the combination of means for connecting fabric members, one at a time, in spiral relation to the end of a previously formed fabric tube, to form said fabric units, and means for causing a progressive step-by-step spiral movement of said fabric tube with reference to said connecting means.

35. In a machine for making wire fabric composed of adjacent, connected, similarly formed fabric units, each adapted to constitute at least two sides of a fabric mesh, the combination of means for successively forming incomplete fabric members, means for connecting said incomplete fabric members to the fabric, side by side and one at a time, successively, to form said fabric units, and means for causing relative lateral movement of said fabric with reference to said forming means.

36. In a machine for making tubular wire fabric composed of spirally arranged, similarly formed fabric units, the combination of cutting mechanism for severing lengths of wire from a continuous wire supply, forming mechanism adapted to shape said lengths of wire into incomplete fabric members, means for connecting said fabric members, one at a time, to a previously formed fabric portion, and means for causing relative step-by-step lateral movement of said previously formed fabric portion with reference to said cutting and forming mechanisms.

37. In a machine for making tubular wire fabric composed of spirally arranged fabric units, each adapted to constitute at least two sides of one of the meshes of the fabric, the combination of means for severing lengths of wire from a continuous wire supply, means for forming said wire lengths into incomplete fabric units, means for successively connecting each of said incomplete fabric units, one at a time, to a previously formed fabric portion in spiral relation relative to the axis of said fabric and for completing said fabric units, and means for spirally advancing said fabric step-by-step with reference to said connecting mechanism.

38. In a machine for making tubular wire fabric composed of spirally arranged, similarly formed fabric units, each adapted to constitute at least two sides of one of the meshes of the fabric, the combination of means for feeding the wire, means for severing successively equal lengths of wire from a continuous wire supply, means for forming said wire lengths into incomplete fabric members, and means for successively connecting said fabric members, one at a time, to the previously completed fabric in spiral relation relative to the axis of the fabric tube, to constitute said fabric units.

39. In a machine for making wire fabric composed of four-sided meshes, the fabric units each constituting at least two sides of one of said meshes, the combination of means for forming fabric members, means for connecting said fabric members singly, side by side, to the edge of a previously completed fabric portion, and means for forming said units after being connected.

40. In a machine for making tubular wire fabric of indefinite length, having similar four-sided meshes and composed of spirally arranged, similarly formed fabric units, each adapted to constitute at least two of the sides of one of said meshes, the combination of means for severing equal lengths of wire from a continuous wire supply, means for forming said wire lengths into incomplete fabric members, means for successively connecting said fabric members, one at a time and side by side, in spiral relation to the edge of a previously completed fabric portion, and means for effecting a progressive movement of said fabric portion on its axis relative to said severing mechanism.

HARVEY E. BROWN.